United States Patent [19]

McDowell

[11] Patent Number: 4,940,540
[45] Date of Patent: Jul. 10, 1990

[54] SUBMERGED BIOLOGICAL WASTEWATER TREATMENT SYSTEM

[75] Inventor: Curtis S. McDowell, Allentown, Pa.

[73] Assignee: Tri-Bio, Inc., Allentown, Pa.

[21] Appl. No.: 298,937

[22] Filed: Jan. 23, 1989

Related U.S. Application Data

[62] Division of Ser. No. 70,899, Jul. 8, 1987, Pat. No. 4,818,404.

[51] Int. Cl.$^5$ .............................................. C02F 3/06
[52] U.S. Cl. ........................................ 210/150; 261/94
[58] Field of Search ............................. 210/615–618, 210/150, 151, 197, 209, 258; 261/94–99

[56] References Cited

U.S. PATENT DOCUMENTS

| | | | |
|---|---|---|---|
| 3,923,656 | 12/1975 | Krebs et al. | 210/151 X |
| 3,966,599 | 6/1976 | Burkhead | 210/151 X |
| 4,045,344 | 8/1977 | Yokota | 210/151 X |
| 4,439,316 | 3/1984 | Kozima et al. | 210/150 |
| 4,613,434 | 9/1986 | Määttä | 210/151 |
| 4,623,454 | 11/1986 | Tauscher et al. | 210/150 |
| 4,637,903 | 1/1987 | Bardo et al. | 261/94 X |
| 4,683,062 | 7/1987 | Krovak et al. | 210/150 X |

Primary Examiner—Tom Wyse

[57] ABSTRACT

This invention relates to a process and reactor system suitable for biological treatment of wastewaters or for other applications wherein effective and intimate contact between biological populations attached to a fixed surface and liquid born chemicals and gaseous atmospheres is required. The reactor includes a sealed housing generally having a plurality of independent-vertical chambers, each open at the top and bottom and each filled with high surface-area packing and disposed annularly around a central-vertical chamber. The central vertical chamber is also open at the top and bottom, but free of packing. The bottom of the central chamber is in communication with the bottom of each of the independent-annular columns by means of a bottom-freeboard chamber. The top of the central-vertical chamber is also in communication with the top of each independent-vertical chamber by means of a top-freeboard chamber created by setting the liquid level in the reactor at a position above the top of all vertical chambers. Agitation within the reactor maintained by effecting downward flow of fluid and gases in said central-vertical chamber. A central-vertical chamber contains a pump which circulates fluid from the top freeboard chamber and/or the fluid and gases from the gaseous freeboard of the reactor, downward through the central-chamber, radially across the floor of the reactor and vertically up through the vertical chambers. The fluid then flows radially inward in the top-freeboard chamber and returns to the central chamber thus providing a continuous toroidal recirculation.

5 Claims, 3 Drawing Sheets

SUBMERGED BIOLOGICAL WASTEWATER TREATMENT SYSTEM

This is a division of application Ser. No. 070,899, filed July 8, 1987, Patent No. 4,818,404.

TECHNICAL FIELD

This invention relates to a process and reactor suitable for biological treatment of wastewater or for other applications involving intimate contact between biological populations attached to a fixed surface.

BACKGROUND OF THE INVENTION

A wide range of methods and apparatus are known and have been widely utilized in the fixed biological film aerobic treatment and anaerobic treatment of aqueous liquors containing biodegradable waste products. The term "fixed film" refers to systems where the microorganisms are attached to the surface of a solid inert material as opposed to being freely suspended as e.g., agglomerated particles in a liquid medium.

There are basically three general categories of fixed film aerobic and anaerobic treatment processes, a submerged system, in which the fixed film is submerged in a aqueous liquor, a trickle-bed system which the fixed film is exposed to the atmosphere in aqueous liquors trickled over the film and a combination in which the fixed film is alternately immersed in an aqueous liquor, and then exposed to air or inert gas as is done in a rotating biological contacter. In the submerged fixed film category, the micro organisms are attached either to the surface of the immobile solid matrices or to mobile solid particles submerged in a aqueous liquor.

Representative patents which illustrate submerged fixed film and mobile matrix type systems for effecting biological degradation of waste products are shown in the following patents.

U.S. Pat. No. 3,966,608, illustrates a submerged technique for aerobically biologically treating waste products containing submerged packing, such as Raschig or Pall rings. The treatment zone utilizes a central column and adjacent oxidation zones in fluid communication with the central column. An aerating fan is located at the top of column to draw the liquor upwardly through the column and the waste sprayed outwardly over a packing to effect aeration thereof, and then caused to flow downwardly through the adjacent columns. The microorganisms which are fixed to the packing effect oxidation of the waste.

U.S. Pat. No. 3,235,234 illustrates a technique for treating waste, wherein a treatment zone is immersed in a tank containing waste, the treatment zone being filled with a porous packing such as saddles, wire mesh or corrugated sheets defining a serpentine path in the vertical direction. An oxygenating gas is introduced through a diffuser, such as a sparge unit, placed beneath the packing. Both waste and oxygenating gas are forced upwardly through the packing unit and the waste biologically digested.

U.S. Pat. No. 4,267,052 discloses a process an apparatus for aerating and circulating a liquid in a vessel utilizing a surface aerator and bottom mixing rotor mounted on a hollow common shaft. The combination of the surface aerator and submerged rotor permits good bottom mixing as well as aeration of the medium at the bottom of the tank for enhanced biological degradation.

U.S. Pat. No. 4,425,231 discloses a wastewater treating apparatus which includes a circulation type aeration tank, having both downward and upward flow chambers which communicate with each other at the upward and lower ends. An oxygenated gas is supplied to the downward flow chamber and wastewater and return sludge are supplied to a given position or elevation in the upward flow chamber such that a reduction zone with low concentration of dissolved oxygen is formed at the upper portion of the upper flow chamber.

SUMMARY OF THE INVENTION

This invention relates to an improvement in a submerged fixed film biological treatment system and in a reactor for use in such system. The improvement in the biological fixed film system involves establishing a housing having at least one independent-vertical chamber each open at the top and bottom and each chamber being in fluid communication with the other at both top and bottom, and filled with high surface-area packing, which defines a serpentine pathway in the vertical direction. The independent-vertical chamber is disposed annularly around a central-vertical chamber which is also open at the top and bottom. The top and bottom of the central chamber is in fluid communication with the top and bottom of each of the annular independent-vertical chambers. At the top of the central-vertical chamber and top of independent-vertical chamber there is a top-freeboard chamber created by setting the liquid level in the reactor at a position above the top of all vertical chambers.

The central chamber is free of packing, but contains a pumping means for generating downward flow of fluid and gases in said central-vertical chamber. The gas and fluid mixture move downward through the central-chamber and upon reaching the floor of the reactor it is radially dispersed across the floor of the reactor which extends below the chambers sweeping it clean of solids. The mixture then flows vertically upward through the independent-vertical chambers. When the fluid and gas mixture reaches the water surface, the gas disengages and the fluid flows radially inward in the top-freeboard chamber and returns to the central-vertical chamber pump for recirculation. The reactor thus provides a continuous toroidal recirculation of fluid and/or fluid and gases within the reactor housing.

There are numerous advantages associated with the process and reactor utilizing the submerged fixed film and immobile matrix treatment system of this invention and some of these inventions are as follows:

there is an ability to achieve very high rates of flow of liquor though the packing thus improving the efficiency of the biological processes;

the bottom freeboard and independent-vertical chamber arrangement annularly about a central chamber work to provide uniform vertical flows through the packing;

velocities at the floor of the reactor may be maintained high to prevent accumulation of solids on the floor;

there is an ability to achieve high mass transfer rates of dissolved gases into and out of the water because two means of dispersion of gas with the water is used, i.e., the pump that induces gas into the fluid flow and the rise of gas bubbles through the packing;

there is an ability to aerate the entire packing while maintaining proper mixing in the reactor;

there is an ability to operate the reactor in either an aerobic, facultative anaerobic or anaerobic mode by controlling the gas phase composition or by controlling the gas induction capacity of the central-chamber pump;

there is an ability to process greater quantity of organic wastes per unit time because of the high oxygen mass transfer capacity available;

there is an ability to process relatively low strength organic wastes anaerobically or aerobically because of an ability to obtain high flow velocities through the packing and reduce the boundary layer thickness at the interface of the biological slime and the bulk liquid, and promotes macro-mixing in the bulk liquid to minimize rate limitations of biological reaction by diffusion processes in the bulk liquid;

there is simplicity of change-over from aerobic to anaerobic treatment if the nature of the waste changes; and there is the ease with which these modules can be linked together with one operating aerobically and another operating anaerobically without redesign of equipment.

THE DRAWINGS

DETAILED DESCRIPTION OF THE INVENTION

Figure 1:
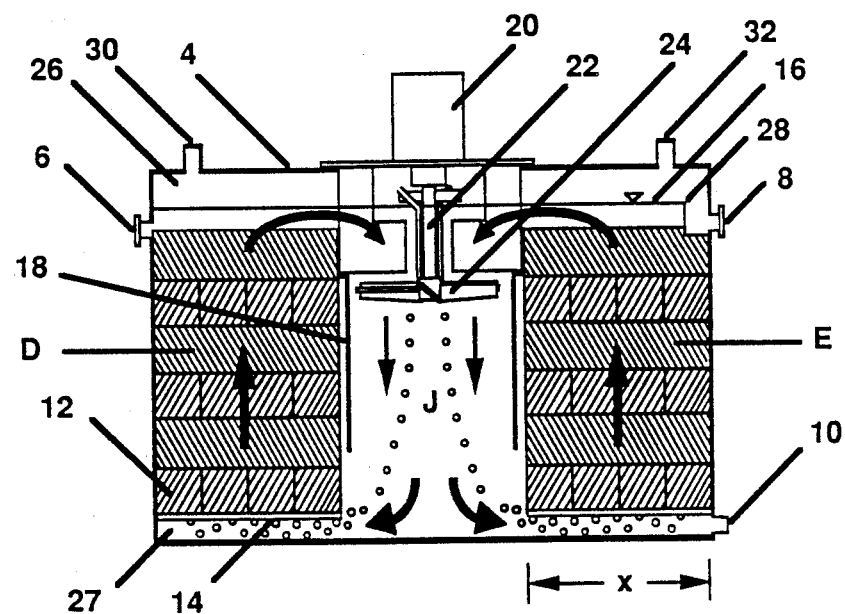
FIG. 1 is a view in cross-section and elevation of the submerged fixed film biological treatment system.
Figure 2:
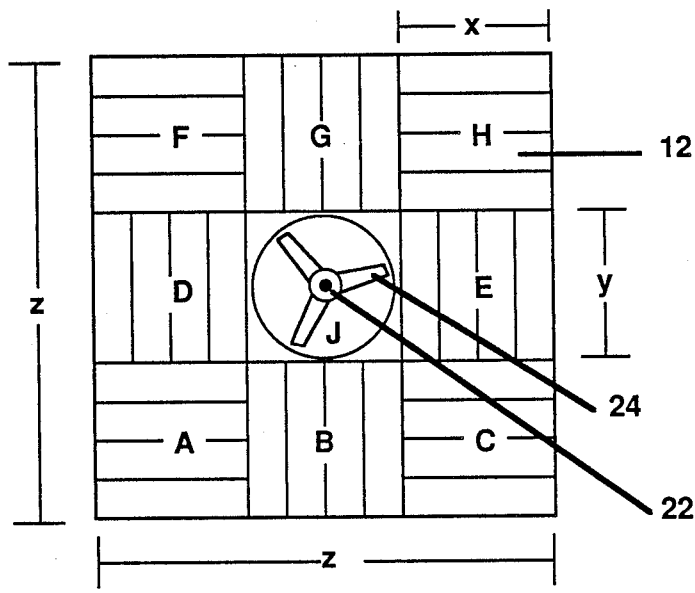
FIG. 2 is a top view of the biological treatment system as shown in FIG. 1.

To facilitate an understanding of the preferred process and apparatus utilizing the submerged fixed film and immobile matrix treatment system of this invention, reference is made to FIGS. 1 and 2. A sealed housing 4 having an inlet 6 for introduction of wastewater or water borne chemicals, an effluent line 8 for removal of biologically treated effluent. A drain 10 is located near the bottom of housing 4, and may be used for periodically cleaning exceptionally heavy grit from the housing. A plurality of vertically extending chambers A and B (identified as chambers A, B, C, D, E, F, G, and H in FIG. 2, are disposed about a central chamber J. The chambers A-H are arranged such that they form a ring around chamber J, with each chamber being in fluid communications at the top and at the bottom with central chamber J and with every other chamber. Within chambers A-H are contained corrugated packing or other high surface-area packing materials 12 supported on a structural grid 14.

Each vertically extending chamber designated A-H and including J, is separate and independent from the others at all points except at the bottom and top of the column so that there is no fluid flow in a horizontal direction between the chambers. This prevents horizontal short circuiting and encourages uniform upward vertical fluid and gas flow through the packing. The annular independent-vertical chambers A-H should also be of equivalent size to encourage equal distribution of upward vertical flow through the plurality of chambers. Many configurations are possible e.g. rectangular or combined as a single chamber or unit. An example of a rectangular system would be a combination of chambers F, G and H and A, C, and D. For efficient arrangement the chambers defining the annular ring are square and there are eight in number. Central chamber J also is equal in size to the chambers A-H. However, other configurations may be used. Waste influent is added to the reactor to a waste level 16 filling all of the chambers. A top freeboard 26 establishes a gaseous area within the housing which serves as a source of gas if aerobic conditions are required or inert gas source if anaerobic conditions are required.

The packing used in the annular independent-vertical chambers A-H which is thusly immersed in wastewater, may be of the rigid matrix type or may be random packing materials, e.g., Raschig rings, pall rings etc. Matrix blocks are preferred and usually are formed from thin sheets of corrugated polyvinyl chloride or polypropylene. The individual diagonally-corrugated sheets are typically glued in stacks with flutes or alternate sheets at opposing angles and oriented 30° to the direction of the flow of gases and liquid through the matrix module. The matrix blocks should have surface to volume ratios varying from 20-70 square feet per cubic foot and behave as static mixers and gas dispersion devices, as well as providing biological growth surface, when they are employed in the manner of this invention. The matrix blocks are typically from one to two feet high, from one to two feet wide and from one to twelve feet long.

As indicated the matrix blocks are stacked in layers within each vertical chamber A-H. Each layer is angularly offset from the layer above or below it usually by 90° which is the most efficient angular offset. The offset angle could range typically from 45°-90° however depending on the particular matrix block configuration. The preferred matrix block orientation provides more effective dispersion of gas and liquid as it moves rapidly upward through the stack of matrix blocks in each annular independent-vertical chamber. Each of the annular independent-vertical chambers A-H should be packed indentically so that the resistance to fluid flow in each will be the same. The waste fluid received by chambers A-H from the central chamber J will thus be more uniformly distributed to each of the vertically extending annular chambers A-H. The latter is an important feature of the invention, helping to maintain uniform growth on the packing surfaces. Examples of packing materials and stacking arrangements are shown in U.S. Pat. No. 4,599,174 as well as packings in U.S. Pat. Nos. 4,599,174, 3,785,620; 4,296,050; 3,947,532; 3,450,393; 3,415,502; and 4,303,600, which are incorporated herein by reference.

By alternating the orientation of the first layer of blocks in each independent-vertical chamber A-H as shown in FIG. 2 the matrix blocks in each layer of a given annular independent vertical chamber interact with those in the adjacent vertical chamber to create an impervious vertical wall between all vertical chambers A-H. Thus, the requirement for specific baffles to form separate horizontally independent vertical chambers e.g., chambers A-H from each other is eliminated. Perforations are sometimes introduced into the individual corrugated plastic sheets making up commercially available matrix blocks. This is to improve distribution and mixing between the gas and liquid flowing through the matrix blocks. The lamellas in the preferred matrix module, for use in the fixed film biological system of this invention, have no perforations in order to prevent horizontal flow between chambers A–H.

Vertical chamber J is isolated from chambers A–H by draft tube 18 which is fitted to the square opening of chamber J by square-horizontal baffles fitted to the top and bottom of the open ended, top and bottom, draft tube 18. This tube 18 also serves as a housing for an axial flow downward pumping system comprising motor 20, shaft 22 and impeller 20. The effectiveness of the pumping system and as an aerator is greatly enhanced by draft tube 18 in chamber J although the system can be operated without the draft tube. The axial flow pump may be designed to induce air flow down shaft 22, e.g., via a concentric hollow shaft. The gases are introduced to the fluid below impeller 24 and the gases thus induced are finely dispersed as bubbles into the liquid and entrained therein. High levels of turbulence and the pressure head below the impeller serve to promote extremely rapid transfer of soluble gases into the liquid waste. This first gas transfer capability in the submerged film biological system is important in an aerobic reactor. A second gas transfer mechanism, i.e., the corrugated packing further extends the treatment capacity of this reaction.

The pumping capacity of the pump-impeller 24, and the size of the draft tube 18 in which the pump operates establishes the downward vertical velocity for carrying the bubbles to the floor of the reactor. The preferred downward velocity is 2.5 to 3.5 feet per second but the system can be operated between 1.5 and 4.0 feet per second or more. It is also well known that the larger the impeller diameter relative to the effective diameter of the tank the more rapidly the tank can be mixed at a given horsepower. In the preferred embodiment of this invention the ratio of impeller diameter ($d_{imp}$) to effective tank diameter ($d_{tank}$) is 0.25 and preferably between 0.10 to 0.29. This minimizes energy consumption per treatment capacity. The overall pumping capacity of the pumping device, e.g., an axial flow pump required in the central-vertical chamber is also a function of the desired upward vertical velocity through the packing in the annular independent-vertical chambers A–H. The preferred velocity upward through the packing is 0.22 to 0.32 but can range from 0.13 to 0.36 feet/second. Not only is the downward velocity in central chamber J and upward velocity in chambers A–H, important, but the horizontal velocity of fluid and gas mixtures sweeping the floor of the vessel is also important. As the fluid passes out of the bottom of the central chamber J and into the bottom freeboard space 28 the velocity of the liquid must accelerate to velocities that will carry the gas bubbles nearly to the outer edges of the annular and independent vertical chambers A–H. It is estimated based on experimental observations that the velocities required to disperse the gas to the outer edges of the annular vertical chambers is proportional to the breadth of the annular chambers x. The design criteria established is that the horizontal velocity in ft/sec. at the bottom of chamber J and has a velocity value V, equal to $x \div 0.66 \pm 0.3$ and preferably not more than 10%. Once the pumping capacity of the axial-flow pump in central chamber J has been established the horizontal velocity V can be established by setting the height of the support grid 14 the proper distance above the reactor floor.

Gases entrained in the fluid entering the bottom of the packing in chambers A–H rise through the packing material contained therein. The bubbles frequently encounter mixing and dispersion points in the matrix blocks or packing material and are broken into smaller bubbles or prevented from coalescing. The relatively slow progression of the bubbles through the packing, the continual dispersion of the gas bubbles as they rise through the packing, and the relatively turbulent flow created within the packing by the specified upward fluid flow velocities in the packing combine a second aeration means. The combined gas dissolution efficiency of the two aeration means provides for enhanced treatment capacity. Both gas transfer processes are powered by the same motive force and thus the efficiency of the reactor is high.

To summarize, the internal mixing patterns of the submerged film biological system of this invention are as follows. Influent from inlet 6 first mixes with liquid rising up through the packing 12 and flows to the center chamber J where it is mixed with fluid contained in the fixed film biological system. The mixture is pumped to the bottom of the reactor housing 4 with or without entrained gases where the high horizontal velocity fluid sweeps the floor clear of solids and the fluid and gases, if present, then rise through the packing in the independent vertical chambers to the waters surface where entrained gases may be released to the top freeboard chamber 26 above the water. The fluid then below top freeboard chamber 26 entrains new influent waters, flows radially inward to central chamber J and repeats the flow pattern. Water borne chemicals entering the housing 4 are thus repeatedly exposed to the biological slimes which grow and/or are fixed in place on the surface of the high surface-area packing 12 contained in the vertical chambers A–H. Water leaves the sealed housing 4 via displacement through an internal or external flooded over-flow weir 28 which maintains a liquid seal against escape of the gases in top freeboard chamber 26. The overall pattern of mixing in the fixed film biological system of this invention is that of a torus. The toroidal flow pattern of this invention results in a completely mixed submerged film biological system. The latter is unique in that most other fixed film biological reactor systems have strong plug flow characteristics and thus a decreasing concentration gradient as the waste proceeds through the unit. The latter is due to the use of two dimensional mixing patterns or a lack of provision for proper and sufficient turnover of fluid in the reactor.

The apparatus is uniquely versatile and can be operated in an anaerobic mode, a facultatively anaerobic mode or in an aerobic biological treatment mode depending on the nature of the wastewater or water-borne chemicals to be treated. This versatility is exercised by controlling the composition of the gases in top freeboard chamber 26 of the submerged film biological system. For example, in one application of the invention wherein a dissolved oxygen free environment, i.e., an anaerobic environment, is required during contact of biological populations with wastewater or liquid borne chemicals; the top-freeboard chamber 26 of the reactor is isolated from the atmosphere by closing off air inlet 30, and is thus starved of gaseous oxygen. The bacteria consume any oxygen present in the gaseous freeboard space, the incoming influent and the fluid within the sealed housing 4. The Oxidation Reduction Potential (ORP) of the process drops to $-470 \pm 30$ mv. and the bacteria begin to operate anaerobically. Methane which may be produced under these conditions is vented from sealed housing 4 through vent 32 and a water trap (not shown) to prevent entrance of oxygen. The methane may be used as fuel or flared. When operating anaerobically the pumping device in central chamber J may or may not be operated in a gas induction mode. Although gas recirculation is not required for anaerobic operation it may be desirable in cases for example where hydrogen sulfide can be scrubbed from the gases into freeboard chamber 26 using a separate scrubbing tower in a side loop process, to reduce the sulfur content of the wastewater being treated.

In an aerobic biological process application, wherein an oxygen rich environment is desired for aerobic biological processing of water borne chemicals or wastewater, the top freeboard 36 of the fixed film biological reactor may be purged with air or pure oxygen at controlled rates and the pumping device in central chamber J used to induce a large flow of oxygen-rich gases into the down-flowing fluid in the central chamber J. The combined effects of the gas induction with high shear and high fluid velocities, toroidal dispersion of liquid and gases, maintenance of high liquid velocities through the packing and across the reactor floor, and gassing of the entire high surface-area packing provides unusually high oxygen-dissolution efficiency, reactor efficiency and reactor capacity in this invention.

The application of the fixed film biological system of this invention in extended biological processing of wastewaters or water borne chemicals permits new achievements in biological processing. By simply placing a sequence of the systems and apparatus of this invention in series, one can complete sequential anaerobic, aerobic and facultative anaerobic processing of wastewaters is a simple to operate process train.

Figure 3:
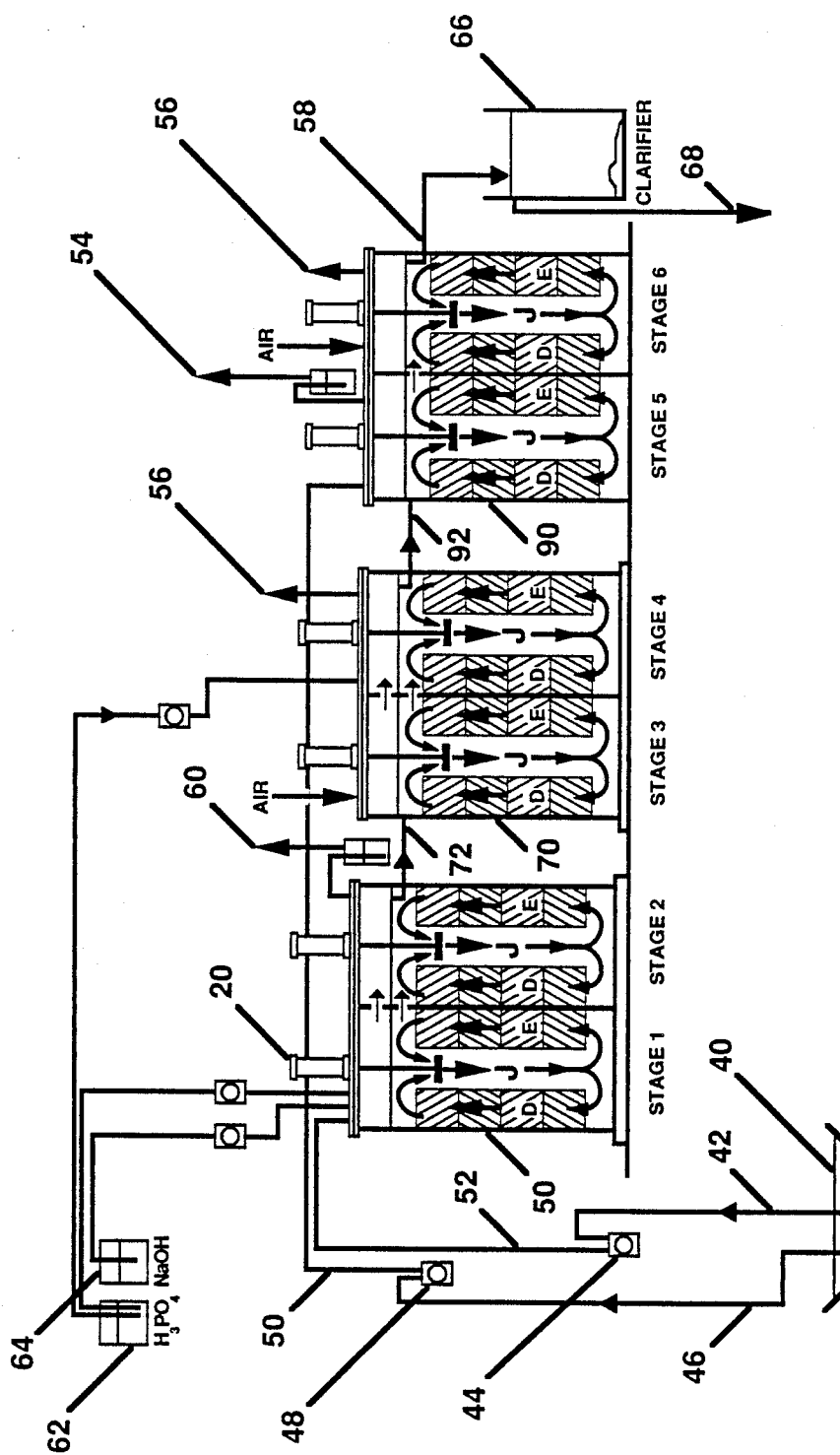
FIG. 3 is a flow diagram in cross-section for a waste treatment process wherein the waste has both nitrogen and organic chemical for removal and in which reactor modules of this invention are operated in anaerobic and aerobic modes.

To facilitate understanding of a waste treatment process benefiting from this invention, reference is made to FIG. 3. FIG. 3 is a schematic of a process train of submerged film biological reactors of this invention and illustrates a six stage treatment process, comprising anaerobic, aerobic and facultative anaerobic (anoxic) treatment of wastewater or water borne chemicals. More specifically, the waste treatment system comprises Sections 50, 70 and 90, each section having two stages, with each stage designed in accordance with the embodiment described in FIG. 1. Each stage has an inlet 52, 72, and 92, the inlet 72 constituting the outlet from section 50 and the inlet 92 constituting the outlet from section 70. Each stage has vertical extending chambers A-H filled with high surface-area rigid polyvinyl chloride matrix blocks for support of the microorganisms and enhanced gas transfer to and from the fluid, placed in the preferred layered orientation for good fluid distribution between the chambers, as shown in FIG. 2. In the embodiment shown, waste is taken from an aerated lagoon 40, through line 42 to influent pump 44, for introduction into stage 1 of section 50. This is pumped through line 52 into stage 1 which in conjunction with stage 2 is operated under anaerobic conditions. Stage 1 and stage two are in fluid communication through the top and bottom freeboard cross sectional areas or through restricted opening at the top freeboard water level.

Air is prohibited from entering the gaseous freeboard above the matrix blocks of section 50 and anaerobic microorganism growth is facilitated by virtue of the effective contacting of the oxygen free fluids of the reactor with the biomass fixed to the high surface-area matrix contained therein. The toroidal mixing pattern embodied in this invention is maintained in the reactors with the fluid flowing downward in chamber J and then rising through the independent-vertical chamber A-H. Uniformity of flow and maintenance of toroidal flow patterns lead to enhanced digestion rates.

Off gases from the anaerobic treatment of the wastewater or waterborne chemicals, including methane, carbon dioxide and hydrogen, are vented from the sealed housing of section 50 through line 60. Appropriate pH control in fluids of section 50 can be maintained through addition of acid 62 or base 64 to the mixed fluids of stage 1 and/or 2.

After anaerobic treatment in section 50, the effluent containing residual chemicals not treated anaerobically, is removed through line 72 to section 70. Like section 50, section 70 comprises two stages, i.e., stages 3 and 4 each stage embodying elements as described in FIG. 1. In contrast to section 50, section 70 is operated under aerobic conditions by introducing fresh air under very low pressure; e.g. between 1" to 10" of water column, into the gaseous freeboard of section 70 at a rate such that the oxygen content of the gas in the top freeboard chamber does not become significantly depleted of oxygen. The gases in the top freeboard chamber, including oxygen, are induced into the axial flow pump in chamber J of both stage 3 and 4. The transfer of oxygen to the recirculating fluid from the gas bubbles thus entrained in the draft tube and matrix block packing of chambers A-H permits the bacteria to complete aerobic degradation of residual chemicals in the effluent of section 50, at a high rate.

The final section, 90 embodies a two stage system, i.e., stage 5 and stage 6, with stage 5 operating anoxically (nitrate is used by the microorganisms as a source of oxygen and no elemental dissolved oxygen or gaseous oxygen is available in stage 5) and stage 6 operating aerobically. The top freeboard chambers of stage 5 and stage 6 are necessarily separate in section 90 as opposed to section 50 and 70 wherein they communicate through restricted openings or over the entire cross section of the top freeboard chamber.

The effluent from section 70 is introduced to section 90 through line 92 and anoxic conditions are maintained in stage 5 by excluding oxygen from the top freeboard chamber of stage 5. A water-trap vent 54 is required on stage 5 to vent gaseous nitrogen and carbon dioxide from stage 5 of section 90. To promote the use of nitrate as a source of oxygen by the bacteria, a secondary source of food is introduced to stage 5 when necessary. The secondary source of food may be methanol, corn syrup or other readily degradable non hazardous chemicals. In some cases a slip of stream of raw influent wastewater may be used. As shown this is piped through line 46 to pump 48 then line 50 to stage 5.

Treated fluid flows from stage 5 to stage 6 through a flooded gas seal wire which minimizes back mixing of gases and liquid between the anoxic stage 5 and aerobic stage 6. In stage 6 aerobic treatment similar to that described for stages 3 and 4 is accomplished to complete the sequential biological treatment process. Air is again introduced to the top freeboard chamber of stage 6 at a low pressure and at controlled rates to achieve desired aerobic treatment conditions. Spent air is discharged through vent 56 to the atmosphere. Effluent from stage 6 is withdrawn through line 58 and discharged into a clarifier 66 wherein biological solids are removed. The clean treated water can then be discharged to the sewer through line 68 or to a clean receiving stream.

What is claimed is:

1. In an apparatus for treating an aqueous liquor containing biodegradable waste chemicals in a vessel having an inlet and outlet said biological digestion being accomplished by contacting the liquor with microorganisms growing in slimes on submerged surfaces of a packing material contained in said vessel through which water and gases move freely; the improvement which comprises:

a sealed vessel having at least first vertically-extending chambers within the vessel, these first chambers forming an annulus around a second centrally-located vertically-extending chamber, said first chamber(s) being in fluid communication with each other only at the top and bottom ends and said second chamber being in fluid communication with said first chamber(s) only at the top and bottom ends; and the space between the sealed vessel and top of the chambers defining a top freeboard chamber above the first and second chambers and the space above the sealed vessel and the bottom of the chambers defining a bottom freeboard chamber below the first and second chambers;

each first vertically extending chamber having a porous matrix within having a large surface area suitable for attachment of microorganisms within the confines of said first annular vertically-extending chamber(s), pumping means placed in said second centrally located chamber for effecting downward flow in the centrally located chamber and upwardly through said first annular vertically-extending chambers and the packing material; and means for introducing gases to the central chamber for downward flow in said second central chamber.

2. The apparatus as recited in claim 1 wherein the said first annular vertically-extending chambers are square in horizontal cross section and are eight in number placed symmetrically around said second vertically-extending chamber which is essentially of the same horizontal cross section as the said first vertically extending chambers.

3. The apparatus as recited in claim 2 wherein the uniform-porous matrix contained in all of the said first vertically-extending chambers comprises of the 90° offset vertical-layering of 1 to 2 feet high rigid matrix blocks having from 20 to 65 $ft^2$ of surface area for attachment of microorganisms per $ft^3$.

4. The apparatus as recited in claim 2 wherein said pumping means comprises a downward pumping motor-driven axial-flow turbine centered on a cylindrical draft tube extending from the center point of the turbine blade to the bottom of said second vertically extending centrally-located chamber.

5. The apparatus as recited in claim 4 wherein said turbine is equipped for gas induction and means are provided for obtaining gas from the top freeboard chamber to said turbine.

* * * * *